(12) United States Patent
Mehler et al.

(10) Patent No.: US 6,214,936 B1
(45) Date of Patent: Apr. 10, 2001

(54) USE OF MICROPHASE-SEPARATED POLYMER BLENDS FOR THE PREPARATION OF PERMEABLE MEMBRANES

(76) Inventors: Christof Mehler, Mundenheimer Str.222, 67061 Ludwigshafen; Axel Gottschalk, Hirschhornring 33, 67435 Neustadt; Ulrike Breiner, Spessartstr. 7, 68642 Bürstadt; Reimund Erich Stadler, deceased, late of Glashütten; by Cacilda Pereira Widmer-Stadler, heir, Fichtenweg 1, 95496 Glashütten; by Marilena Martina Pereira Stadler, heir, Fichtenweg 1, 95796 Glashütten; by Eric Paulino Pereira Stadler, heir, Fichtenweg 1, 95496 Glashütten; by Wolfgang Matthias Stadler, heir, Weimarer Str. 3, 79211 Denzlingen; Thorsten Goldacker, Kriemhildstr. 6, 95445 Bayreuth, all of (DE)

( * ) Notice: Subject to any disclaimer, the term of this patent is extended or adjusted under 35 U.S.C. 154(b) by 0 days.

(21) Appl. No.: 09/338,533

(22) Filed: Jun. 23, 1999

(30) Foreign Application Priority Data

Jul. 1, 1998 (DE) ............................................... 198 29 397

(51) Int. Cl.$^7$ ....................................................... C08L 53/02
(52) U.S. Cl. ............................. 525/89; 525/94; 525/316; 524/505; 523/106
(58) Field of Search ................................ 525/89, 94, 316; 524/505; 523/106

(56) References Cited

U.S. PATENT DOCUMENTS 5,985,979 * 11/1999 Southwicj et al. .................... 524/505

OTHER PUBLICATIONS

Basic Principles of Membrane Tech., Mulder, 40–41, 1951.
Separation of Gases . . . Freeman et al., Trip, vol. 5, No. 5, May 1997, 167–173.
Membranen und Membranprozesse, Staude, 1992, 1–7.
U. Breiner, Dissertation 1997, Universitat Mainz, Kapitel 9.

* cited by examiner

*Primary Examiner*—James J. Seidleck
*Assistant Examiner*—Olga Asinovsky

(57) ABSTRACT

The use of microphase-separated polymer blends, comprising A-B-C triblockcopolymers containing an elastomeric middle block B and A'-C' diblockcopolymers, for the preparation of permeable membranes.

3 Claims, No Drawings

USE OF MICROPHASE-SEPARATED POLYMER BLENDS FOR THE PREPARATION OF PERMEABLE MEMBRANES

The present invention relates to the use of microphase-separated polymer blends consisting of A-B-C triblockcopolymers having an elastomeric middle block B, and A'-C' diblockcopolymers, for the preparation of permeable membranes. Furthermore, the invention relates to these membranes and also to their use for the separation of gas mixtures.

There has now become available a broad range of methods for the separation of mixtures of substances in fluid phase with the aid of membranes. For example, elektrolyte/water mixtures can be separated by means of reverse osmosis, dialysis, electrodialysis or membrane distillation, mixtures of organic substrate and water or of colloid and water by means of ultrafiltration, and mixtures of different organic substrates by means of pervaporation, it being necessary to use in each case membrane types or membrane materials that are compatible with the task to be performed (cf E. Staude, Membranen und Membranprozesse, VCH Verlagsgesellschaft, Weinheim, 1992, pp 1–7).

In order to separate gases, particularly supercritical gases such as oxygen, carbon dioxide or hydrogen, from mixtures thereof, membranes composed of polymers having a high glass transition temperature $T_g$, ie for example polyvinyl chloride, cellulose acetate or polysulfone, are frequently used. When these membranes are used, separation takes place under diffusion control, ie smaller particles show better penetrativeness.

If, on the other hand, volatile organic compounds or higher hydrocarbons such as propane or n-butane are to be separated selectively from eg naturally occurring gas or hydrogen, recourse is made to polymer materials having elastic properties such as cis-polyisoprene or polydimethylsiloxanes. That the volatile organic compounds are easier to separate than, say, supercritical gasses, is due to the higher solubility of the volatile organic compounds in the specified membrane material. On the other hand, it has been found that volatile organic compounds can also be selectively separated when use is made of membranes of poly(1-trimethyl-silyl-1-propyne), a material characterized by a $T_g$ above 250° C. (cf B. Freeman, J. Pinnau, TRIP, 1997, pages 167-173).

All of the the described membrane materials are homopolymeric compounds.

Freeman and Pinnau (ibid, page 169) propose to effect optimization of the separating characteristics by changing the polymeric backbone of the homopolymer such that the torsional movements are minimized. This is usually accomplished by the inclusion of sterically demanding side branches. However, sterically protected monomers cannot be polymerized very efficiently and also tend, eg in the case of cationic or free-radical polymerizations, toward rearrangement reactions, as a result of which a non-uniform polymer backbone is formed, the structure of which cannot be predicted with any reliability. Membrane morphologies having suitable properties cannot be obtained or cannot be obtained as reproducible entities in this manner.

Homogenous polymer blends composed of polyetherimides, polyethersulfones or polyimides as the major component of the mixture and polyvinylpyrrolidone as the minor component, are described as being suitable membrane materials in Marcel Mulder, "Basic Principles of Membrane Technology", Kluwer Academic Publishers, 1991, page 40, 41, but without going into structural features or special separation properties. A feature common to the specified components is that they show a high glass transition temperature of more than 170° C.

U. Breiner, Dissertation 1997, University of Mainz, chapter 9, describes binary mixtures of triblockcolymers comprising poly(styrene-block-butadiene-block-methyl methacrylate) and dibockcopolymers comprising poly (styrene-block-methyl methacrylate) and makes statements on the lamellar morphology of the specified polymer blend. However, no reference is made to possible fields of application of the mixtures obtained.

It would be desirable to be able to make use of membranes based on polymer blends for the separation of fluid mixtures, if said membranes could be adapted at moderate expense to each particular separation problem, and if they could be obtained in a simple manner with good reproducibility and showed a defined morphology.

It is thus an object of the present invention to provide a membrane composed of a polymeric ingredient, by means of which the permeability characteristics can be adjusted to solve different separation problems.

Accordingly, there has been found a method of using microphase-separated polymer blends, consisting of A-B-C triblockcopolymers and A'-C' diblockcopolymers for the preparation of permeable membranes. We have also found these membranes and the use thereof for the separation of fluid mixtures.

Block A of the A-B-C triblockcopolymer used is substantially composed of vinylaromatic monomer units. Particularly suitable are compounds which comply to the general formula

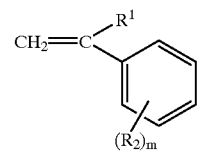

I $R^1$ and $R^2$ independently denote hydrogen, halogen or linear or branched $C_1$-$C_8$ alkyl, m is an integer from 1 to 3. As examples of suitable compounds (I) there may be mentioned styrene, p-chlorostyrene, α-methylstyrene, p-methylstyrene, vinyl toluene and p-tert-butylstyrene. Block A can also be composed of arbitrary mixtures of said compounds. Preferably however, block A is composed of only styrene as the monomer unit.

The average molecular weight of block A can be varied within wide limits. Suitable average molecular weights $M_n$ generally range from 2,000 to 120,000 and preferably from 5,000 to 70,000 g/mol.

Suitable A-B-C triblockcopolymers are generally compounds such as have an elastomeric middle block B, ie component B has as homopolymer or copolymer a glass transition temperature $T_g$ of less than 20° C., preferably less than 0° C. and more preferably less than −20° C. Theoretically, all olefinically unsaturated monomer units can be used for the preparation of block B, provided the criterion concerning the value of $T_g$ is satisfied. In addition, mixtures of olefinically unsaturated monomers are possible.

Preferably conjugate dienes are used as monomers for block B, where those containing from 4 to 16 carbon atoms are preferred. Particularly suitable are conjugate dienes containing from 4 to 8 carbon atoms. Not only linear but also cyclic conjugate dienes can be used. The said conjugate dienes can be substituted by alkyl groups, preferably $C_1$-$C_3$ alkyl, particularly methyl.

As examples there may be mentioned 1,3-butadiene, 1,3-pentadiene, 2-methyl-1,3-butadiene, 2,3-dimethyl-1,3-butadiene and also conjugate hexadienes, preferably 1,3-hexadiene. Particularly suitable monomers for block B are 1,3-butadiene and 2-methyl-1,3-butadiene. If desired, the aforementioned compounds may be used in the form of arbitrary mixtures for the preparation of block B.

Block B of the A-B-C triblockcopolymer may also exist in hydrogenated or partially hydrogenated form. Of these blocks preference is given to a block B which comprises hydrogenated 1,3-butadiene units.

Hydrogenated blocks B generally include those blocks in which at least half of all possible double bonds originally present have been hydrogenated, ie the degree of hydrogenation is in the range of from 50 to 100%, preferably from 70 to 100% and more preferably from 90 to 100%.

The average molecular weight of block B can be varied within wide limits. It is usually adjusted such that the desired properties of the polymer blends and thus the corresponding desired properties of the membrane are obtained. The number-average molecular weight $M_n$ of block B can generally assume values ranging from 5,000 to 200,000 g/mol and preferably from 10,000 to 150,000 g/mol Block C of the A-B-C triblockcopolymer is usually composed of $C_1$-$C_{18}$ alkyl esters of (meth)acrylic acid or arbitrary mixtures of these compounds.

Examples of suitable acrylates are methyl, ethyl, n-propyl, isopropyl, n-butyl, isobutyl, s-butyl, tert-butyl, pentyl, hexyl, heptyl, octyl, 2-ethylhexyl, nonyl, decyl, lauryl and stearyl acrylates. Preferably methyl acrylate, n-butyl acrylate or 2-ethylhexyl acrylate or mixtures of these monomers are used.

Examples of suitable methacrylates are methyl, ethyl, n-propyl, isopropyl, n-butyl, isobutyl, s-butyl, tert-butyl, pentyl, hexyl, heptyl, octyl, 2-thylhexyl, nonyl, decyl, lauryl and stearyl methacrylates. In addition, mixtures of the aforementioned compounds can be used. The preferred methacrylates are methyl methacrylate and tert-butyl methacrylate.

The use of hydroxy-, epoxy- and amino-functional methacrylates and acrylates is likewise possible. In this case it is advantageous to protect the functional groups by eg trialkylsilyl groups prior to polymerization. Such polymerization processes carried out in the presence of protective groups are described in S. Nakahama et al., Prog. Polym. Sci. Vol. 15,299-335, 1990.

The acrylates and/or methacrylates forming block C can be replaced to an extent of up to 50 wt %, preferably from 1 to 20 wt %, by the the following comonomers mentioned by way of example, that is to say by p-aminostyrene, p-hydroxystyrene, p-vinylbenzoic acid, acrylic acid, methacrylic acid, acrylamide, methacrylamide, maleic acid and also their imides or $C_1$-$C_{10}$ alkyl esters, fumaric acid and its imides or $C_1$-$C_{10}$ alkyl esters, itaconic acid and its imides or $C_1$-$C_{10}$ alkyl esters, acrylonitrile, methacrylonitrile, hydroxyalkyl (meth)acrylates or lactones, eg ε-caprolactones.

The average molecular weight of block C can be varied within wide limits. Suitable average molecular weights $M_n$ generally range from 2,000 to 120,000 and preferably from 5,000 to 70,000 g/mol.

The proportions, by weight, of components A, B and C can be varied within wide limits. The content of block A, based on the total weight of the A-B-C triblockcopolymer, is generally in the range of from 10 to 60 wt % and preferably from 20 to 50 wt %. The content of block B preferably ranges from 10 to 80 wt %, more preferably from 20 to 60 wt % and most preferably from 30 to 50 wt %. The preferred contents of block C are similar to those of block A. The sum of the percentages by weight of components A to C always totals 100.

Suitable triblockcopolymers generally have an average molecular weight $M_n$ of more than 10,000, preferably more than 30,000 g/mol, where usually such triblockcopolymers having an average molecular weight $M_n$ in the range of from 35,000 to 500,000 and preferably from 40,000 to 270,000 g/mol are used.

The A-B-C block copolymers can be prepared by known methods of anionic block copolymerization involving sequential addition of the monomers or coupling of the corresponding blocks. Such processes are described in detail in, eg, U.S. Pat. Nos. specifications 3,251,905, 3,390,207, 3,598,887 and 4,219,627. Suitable initiators for the polymerization are alkali metal organic compounds, preferably alkyl lithiums such as methyl lithium, ethyl lithium, n or s-butyl lithium or isopropyl lithium. Particular preference is given to n or s-butyl lithium. Advantageous solvents for use in the polymerization are straight-chain or branched aliphatic hydrocarbons such as n-octane or n-hexane, and also substituted or unsubstituted cycloaliphatic and aromatic hydrocarbons such as cyclohexane, methylcyclohexane or toluene, benzene and any mixture of the aliphatic, cycloaliphatic and aromatic hydrocarbons. Advantageously cyclohexane is used as the solvent. Other suitable solvent components are ethers such as tetrahydrofuran or diethyl ether and also tertiary amines such as eg tetramethylethylenediamine or pyridine in concentrations of from 0.01 to 20 wt % and preferably from 0.01 to 2 wt %. Particular preference is given to tetrahydrofuran.

All starting materials have to be freed from contaminations that are activated by oxygen or protons, which can be carried out for example by contacting them with organometallic compounds or by reaction with eg calcium hydride. Polymerization is carried out under inert gas conditions at temperatures ranging from –100 to +120° C. and preferably at from –80° to 80° C. The process is carried out under pressures at which the monomers and solvents do not evaporate at the polymerization temperature. On completion of polymerization a sufficient quantity of water, methanol or isopropanol is added to the polymerization mixture in order to deactivate the active end groups or excess initiator.

The technique generally employed is such that in a first polymerization stage the vinylaromatic hydrocarbon is polymerized to completion in order to form block A, in the second polymerization step the diene hydrocarbon is converted quantitatively in order to form block B. There are pronounced transitions between the individual blocks.

It is advantageous to cover the living anion of the polydiene block with sterically demanding compounds such as diphenylethylene. By this means an attack of the anion on the ester grouping of the (meth)acrylate of component C is avoided and the reaction is exclusively or almost exclusively continued via the reactive double bond of the (meth) acrylates.

The resulting A-B-C block copolymers can be converted to polymer by conventional methods involving hydrogenation treatment in which the olefinically unsaturated bonds are partially saturated. Usually the conditions are set to give a degree of hydrogenation of from 50 to 100 wt %, preferably from 70 to 100 wt % and more preferably from 90 to 100 wt %.

The hydrogenation is preferably carried out using molecular hydrogen and catalysts based on metals or metal salts of Group VIIIB. It can be effected heterogeneously using, eg, Raney nickel catalyst, or preferably homogeneously using catalysts based on salts, particularly carboxylates, alkoxides or enolates of cobalt, nickel or iron, which are combined with alkylmetal compounds, particularly with trialkylaluminums, or it can be effected homogeneously using diimines that are formed in situ from, say, tosyl hydrazide. Processes for the selective hydrogenation of block copolymers are described, inter alia, in the U.S. Pat. Nos. specification 3,113,986 and 4,226,952.

The polymerization mixture can, to effect isolation of the polymer by known methods, be either directly heated to dryness or steamed, the solvent being removed by distillation. It can alternatively be precipitated in an excess of non-solvent such as ethanol and mechanically separated and dried, or purified by extruder degasification.

The residual content of double bonds of the olefinically unsaturated bonds is determined by Fourier analysis of the infrared spectra or by Wijs iodometric titration and also by $^1$H-NMR-spectroscopic analysis.

The ratio, by weight, of the monomers in the A-B-C block copolymer can be determined by conventional methods, eg by oxidative degradation of the unhydrogenated block copolymers with osmium(VIII) oxide and gravimetric analysis, by infrared spectroscopy or by determination of the refractive index.

For characterization of the block copolymers the following methods are used:

The average molecular weights M and molecular weight distributions (number average $M_n$, weight average $M_w$, U (non-uniformity)=$M_w/M_n-1$) are measured by gel-permeation chromatography with reference to calibration curves for polystyrene (calibrants having a very narrow molecular weight distribution $M_w/M_n$ of ca 1) at 23° C. in 0.125 wt % strength tetrahydrofuran solution at a flow rate of 1.5 mL/min [cf G. Gloeckner, "Polymercharakterisierung durch Fluessigkeitschromatographie", published by A. Huetig, Heidelberg, 1982].

The chemical composition and microstructure of the elastomeric middle block B (1,2 or 1,4 linkage or cis/trans contents of diene in the block) is usually determined by $^1$H-NMR-spectroscopic analysis. The glass transition temperatures are determined with reference to dynamic mechanical analysis (measuring frequency: 1 rad/s).

Suitable A'-C' diblockcopolymers show no block having elastomeric properties such as is described for A-B-C triblockcopolymers. Suitable monomers for the blocks A' and C' are basically the monomers described above for blocks A and C respectively in the A-B-C triblockcopolymer.

The average molecular weight $M_n$ of block A' usually ranges from 500 to 100,000 g/mol and preferably from 1,000 to 60,000 g/mol, while that of block C' usually ranges from 500 to 100,000 g/mol and preferably from 1,000 to 60,000 g/mol.

The ratios, by weight, of the components A' and C' can be varied within wide limits. Generally the content of block A', based on the total weight of the A'-C' diblockcopolymers, ranges from 20 to 80 wt %, preferably from 30 to 70 wt %, and the content of block C' correspondingly ranges from 80 to 20 wt % and preferably from 70 to 30 wt %.

Suitable diblockcolymers A'C' generally have an average molecular weight $M_n$ of more than 10,000 g/mol, preferably more than 30,000 g/mol. Use is usually made of diblockcolymers having an average molecular weight $M_n$ in the range of from 35,000 to 300,000 g/mol, preferably from 40,000 to 180,000 g/mol.

The A'-C' diblockcopolymers are prepared in a similar manner to the manufacturing process described for the A-B-C triblockcopolymers by known methods of anionic blockpolymerization by sequential addition of the monomers or by coupling techniques. Manufacturing processes for A'-C' diblockcopolymers are described eg in Allen et al., Polym. Prepr. 1985, 26 (1), page 247, and in Auschra et al., Macromolecules, 1993, 26, page 6364.

As regards the characterization methods the same applies to block copolymers A'C' as was stated above regarding the A-B-C block copolymer.

In the polymer blends suitable for the preparation of the membranes of the invention the triblockcopolymers A-B-C and diblockcopolymers A'-C' in blocks A and A' and/or C and C' can be identical or different as regards monomeric composition and/or chain length or molecular weight. If blocks A and A' and, C and C', are not fully identical or do not have the same monomeric composition, they are still always compatible with each other. Block B is usually only slightly compatible or incompatible with the block units A and A' and C and C'. By the "compatibility" of two polymer components is generally meant the miscibility of these components or the inclination of one polymer to dissolve in another (cfB. Vollmert, Grundriss der makromolekularen Chemie, Vol. IV, page 222 et seq., E. Vollmert-Verlag, 1979). The following basic relationship holds: the smaller the difference between the solubility parameters of two polymers, the better their compatibility. Since these parameters and the enthalpy of mixing cannot be determined by standard methods for many polymers, the solubility characteristics must be ascertained indirectly, eg by taking torsional vibration readings or by means of dynamic mechanical thermal analysis (DTA). In a polymer system comprising two or more polymers, the polymers can generally be regarded as being miscible or compatible if the system is optically transparent and has only one glass transition temperature lying between those of the starting polymers, or if NMR relaxation experiments show no spin-spin relaxation or spin-lattice relaxation. In addition, it is possible to measure the turbidity and diffraction of light and to employ infrared spectroscopic and spectrofluorimetric methods (L. A. Utracki, Polymer Alloys and Blends, pages 34 to 42, New York, 1989). Examples of miscible polymers are detailed in various monographs (eg J. Brandrup and E. H. Immergut: Polymer Handbuch, 3rd Edition, 1989).

In a preferred embodiment blocks A, A' and C, C' have in each case the same monomeric composition. Examples thereof are blocks A, A' composed of styrene as the monomer and blocks C, C' composed of methyl methacrylate or tert-butyl methacrylate as the monomeric component. Accordingly, the polymer blends of the invention comprise, inter alia, triblockcolymers comprising poly(styrene-block-butadiene-block-methyl methacrylate) (SBM) and two-bock polymers comprising poly(styrene-block-methyl methacrylate) (SM) or poly(styrene-block-butadiene-block-tert-butyl methacrylate) as triblockcopolymers and poly (styrene-block-tert-butyl methacrylate) as diblockcopolymers.

For the preparation of the ABC-A/'C' block copolymer blends the diblockcopolymers and triblockcopolymers may be taken up in an organic solvent, for example, and the solution thus obtained may be placed in a polar liquid medium such as methanol, ethanol, water or mixtures of such liquids. Advantageously, this precipitation process takes place with vigorous agitation. Suitable organic solvents for the said block copolymers are halogenated hydrocarbons such as methylene chloride or chloroform or ethers such as diethyl ether or tetrahydrofuran. Mixtures of said solvents are also suitable. If desired, the solvent can be heated. It is recommendable to remove solvent residues carefully from the polymer blend prior to further processing.

The concentration of triblockcopolymer in the mixture of diblockcopolymers and triblockcopolymers generally ranges from 10 to 90 wt %. Preferably this concentration is in the range of from 30 to 70 wt % and more preferably in the range of from 40 to 60 wt %. Conversely the concentration of diblockcolymers is in the range of from 90 to 10 wt %, preferably from 70 to 30 wt % and more preferably from 60 to 40 wt %.

The ABC-A'C' polymer blends which can be used in the invention are distinguished by a microphase-separated system having lamellar morphology. This morphology is retained, as is not the case with pure diblock or triblock systems (cf R. Stadler et al., "Morphology and thermodynamics of symmetric Poly(A-block-B-block-C) triblockcopolymers", Macromolecules, 28 (1995), page 3080; A. E. Woodward, "Atlas of Polymer Morphology", Hanser Publishers, New York, 1988, Chapter VI, Block Copolymers; J. V. Dankins, "Property structure relationship in Block copolymers-introduction" in D. C. Allport and W. H. Jones, "Block Copolymers", Applied Science Publishers, London 1973, Chapter 8A.1, page 363 et seq.), even when there are present very small contents of elastomeric component B, based on the total weight of the polymer blend, ie no conversion to a cylindrical, spherical or ellipsoid morphology takes place. This behaviour may be regularly observed eg in the case of a content of block B in the polymer blend in the range of from 5 to 50 wt %. The lamellar structures formed can be described eg in terms of the layer sequence ABC/C'A'/A'C'/CBA/ABC/ C'A'/A'C'/CBA. On the other hand numerous other layer variants are possible depending on the volume fraction, molecular weight and compatibility of the triblockcopolymers and diblockcopolymers. A characteristic of all microphase-separated polymer blends is the expansion of the lamellar structure of the triblockcopolymer due to interposition of one or more diblock layers even in the case of very low concentrations of elastomeric component B.

The lamellar superstructure can be found eg by means of small-angle X-ray scattering or transmission electron microscopy.

The polymer blends described can be processed to permeable membranes having good barrier properties, which can be used for the separation of fluid gas mixtures. A suitable method for the preparation of the membranes is a process such as is described in M. Mulder, "Basic Principles of Membrane Technology", Kluwer Academic Publishers, Dordrecht, 1991, Chapter III. For example, suitable membranes can be obtained from solutions of the polymer blends by controlled evaporation of the solvent. Examples of suitable solvents are halogenated hydrocarbons such as methylene chloride or chloroform, aromatics such as benzene or toluene, aliphatic ethers such as diethyl ether or tetrahydrofuran, or ketones such as acetone or methyl ethyl ketone. Particular preference is given to the use of halogenated hydrocarbons, particularly chloroform. Alternatively, arbitrary mixtures of said compounds may be used. In addition to completely miscible solvent systems, partially immiscible or completely immiscible solvent systems are also suitable. The polymeric membrane that is formed can be applied to a porous substrate, eg a polyester panel, or to a non-porous substrate composed of glass, metal or, eg, polymethyl methacrylate or Teflon.

Alternatively, the membrane of the invention may be obtained, for example, by means of spin-coating, roll casting or extrusion.

The invention is illustrated below with reference to the following examples.

EXAMPLES

There was used as triblockcopolymer poly(styrene-block-butadiene-block-methyl methacrylate) (SBM) having a molecular weight $M_n$ of 46,000 g/mol and containing 30 wt % of styrene, 38 wt % of butadiene and 32 wt % of methyl methacrylate, based on the total weight of the A-B-C triblockcopolymer. As the A'-C' diblockcopolymer there was used poly(styrene-block-methyl methacrylate) (SM) having a molecular weight of 54,000 g/mol. The diblockcopolymer was composed of 46 wt % of styrene and 54 wt % of methyl methacrylate. The block copolymers were synthesized by the process described in Auschra et al., Macromolecules, 1993, 26, page 6364, and also in C. Auschra, Dissertation, 1992, University of Mainz.

The molecular weights were determined by means of gel-permeation chromatography using polystyrene as standard. The percentages, by weight, of the block components were determined by means of $^1$H-NMR-spectroscopic analysis.

For preparation of the polymer blends the diblockcopolymers and triblockcopolymers were dissolved in warm tetrahydrofuran (from 1.2 to 1.5 wt/vol %) and the solution was precipitated by passage through a filter into vigorously stirred methanol (10-fold amount of tetrahydrofuran solution used). The precipitated polymer blend was dried in high vacuum at 60° C. The following table indicates the compositions of the resulting polymer blends and also the percentage by weight of polybutadiene used as component B, based on the total weight of the polymer blend. All of the ABC/A'C' polymer blends listed showed a lamellar morphology.

TABLE

| | SBM [wt %] | SM [wt %] | a)polybutadiene component [wt %] |
|---|---|---|---|
| 1 | 77 | 23 | 30 |
| 2 | 66 | 34 | 25 |
| 3 | 53 | 47 | 20 |
| 4 | 39 | 61 | 15 |
| 5 | 26 | 74 | 10 | a)based on the total weight of the polymer blend

We claim:

1. A permeable membrane, comprising a microphase-separated polymer blend having lamellar morphology composed of i) from 10 to 90 wt % of an A-B-C triblockcopolymer comprising a block A composed of vinylaromatic monomers, an elastomeric middle block B composed of conjugate dienes and a block C composed of $C_1$-$C_{18}$-alkyl esters of (meth)acrylic acid or a mixture thereof and ii) from 90 to 10 wt % of an A'-C' diblockcopolymer, comprising a block A' composed of vinylaromatic monomers and a block C' composed of $C_1$-$C_{18}$-alkyl esters of (meth)acrylic acid or mixtures thereof.

2. A method of separating fluid gas mixtures which comprises passing said mixtures through a permeable membrane as defined in claim 1.

3. A method as defined in claim 2, wherein the content of block B, based on the polymer blends, ranges from 5 to 50 wt %.

* * * * *

UNITED STATES PATENT AND TRADEMARK OFFICE
CERTIFICATE OF CORRECTION

PATENT NO. : 6,214,936 B1
DATED : April 10, 2001
INVENTOR(S) : Mehler et al.

It is certified that error appears in the above-identified patent and that said Letters Patent is hereby corrected as shown below:

<u>Title page,</u>
Should read:

-- [73] Assignee:  BASF Aktiengesellschaft,
            Ludwigshafen (DE) --

-- [74] *Attorney, Agent or Firm* -- Keil & Weinkauf --.

Signed and Sealed this

Sixth Day of November, 2001

Attest:

NICHOLAS P. GODICI
*Attesting Officer*    *Acting Director of the United States Patent and Trademark Office*